United States Patent
Tran et al.

(10) Patent No.: US 11,706,357 B2
(45) Date of Patent: Jul. 18, 2023

(54) MULTIFUNCTION PERIPHERAL NATURAL LANGUAGE CHATBOT

(71) Applicant: Toshiba TEC Kabushiki Kaisha, Shinagawa-ku (JP)

(72) Inventors: Hung Tran, Mission Viejo, CA (US); Halley Bradt, Laguna Hills, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 37 days.

(21) Appl. No.: 17/409,983

(22) Filed: Aug. 24, 2021

(65) Prior Publication Data
US 2023/0060553 A1 Mar. 2, 2023

(51) Int. Cl.
| | | |
|---|---|---|
| *H04N 1/00* | (2006.01) | |
| *G10L 15/26* | (2006.01) | |
| *G10L 13/04* | (2013.01) | |
| *H04L 51/02* | (2022.01) | |
| *G10L 15/22* | (2006.01) | |

(52) U.S. Cl.
CPC ......... *H04N 1/00403* (2013.01); *G10L 13/04* (2013.01); *G10L 15/22* (2013.01); *G10L 15/26* (2013.01); *H04L 51/02* (2013.01); *H04N 1/00042* (2013.01); *H04N 1/00488* (2013.01); *G10L 2015/223* (2013.01)

(58) Field of Classification Search
CPC ......... G10L 13/04; G10L 15/22; G10L 15/26; G10L 2015/223; H04L 51/02; H04N 1/00042; H04N 1/00488; H04N 1/00403
See application file for complete search history.

(56) References Cited

U.S. PATENT DOCUMENTS

| | | | |
|---|---|---|---|
| 10,767,879 B1* | 9/2020 | Burnett | F24F 11/30 |
| 2020/0106896 A1* | 4/2020 | Kondoh | H04N 1/00395 |
| 2021/0157536 A1* | 5/2021 | Sugawara | G06F 3/1253 |
| 2021/0176371 A1* | 6/2021 | Yamazaki | H04N 1/00408 |
| 2021/0294882 A1* | 9/2021 | Shinkawa | H04N 1/00204 |
| 2021/0398530 A1* | 12/2021 | Kasahara | G06F 3/167 |

* cited by examiner

Primary Examiner — John R Wallace
(74) Attorney, Agent, or Firm — Ulmer & Berne LLP; John X. Garred

(57) ABSTRACT

A system and method for natural language communication between a user and a multifunction peripheral incorporates a chatbot. The chatbot response to verbal user commands or inquiries with corresponding device reports or operation. The chatbot operates in conjunction monitored multifunction peripheral states and document processing jobs, and tenders a verbal reply accordingly, supplying information to inform the user of additional matters related to the inquiry and of likely usefulness to the user.

18 Claims, 7 Drawing Sheets

MULTIFUNCTION PERIPHERAL NATURAL LANGUAGE CHATBOT

TECHNICAL FIELD

This application relates generally to printing. The application relates more particularly to multifunction peripheral document processing operations performed with a natural language exchange with a user.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Multifunction peripherals are complex devices that require restocking of consumables and device maintenance or repair.

BRIEF DESCRIPTION OF THE DRAWINGS

Various embodiments will become better understood with regard to the following description, appended claims and accompanying drawings wherein:

DETAILED DESCRIPTION

Figure 1:
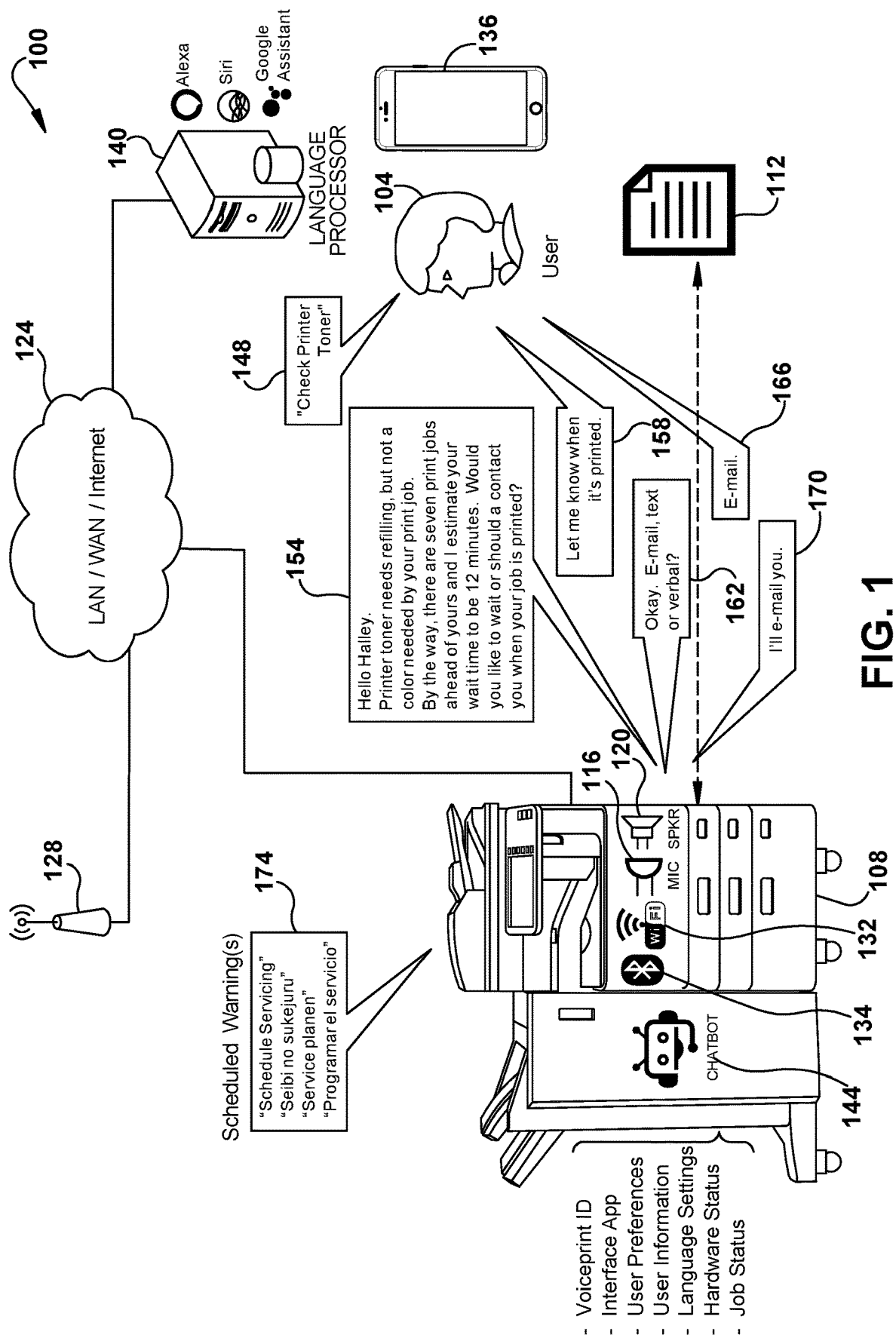
FIG. 1 is an example embodiment of a multifunction peripheral natural language chatbot system.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Example embodiments in the subject application provide natural language dialog between an MFP and a user. While example embodiment herein include verbal natural language exchanges it is understood that a natural language exchange is suitably done via direct text input and/or output, to accommodate, for example, special needs users or users with a particular communication preference. A user can commence with a question or an instruction or command. The system comprises a chatbot that seeks to respond to requests in the most helpful way possible. To accomplish this, the chatbot works to understand what is being asked determine as best possible a motivation for the request. This objective is at the center of how the chatbot works.

When the chatbot receives a verbal request, speech recognition technology converts a request to text. Next, the chatbot analyzes the text, in combination with useful information such as recent requests or the type of MFP being used, to identify possible interpretations. To weigh options, the chatbot compiles a list of the different interpretations of a received request and how it would respond to each one. These options are then ranked to find the best response. A chatbot may also identify a user for more customized interaction.

Many signals help the chatbot rank the available responses, including the following main factors:

How sure the chatbot is that it understood what was asked.

Whether a response is actually available for a particular interpretation of a request.

How satisfied previous users were with a particular response to similar requests.

How recently the response was created, to secure a variety of fresh, high-quality responses.

If something was asked for more recently, the chatbot may use an identified user's earlier request to understand what is being asked.

In limited circumstances, some high-quality responses may be manually curated to rank higher, for the purpose of improving the user experience. For example, users may frequently ask how many print jobs are ahead of theirs. The chatbot may adapted by offering this information to some or all users. Chatbot responses can also correspond to a monitored state of an MFP, as well as personalized aspects of a user or their document processing job. For example, a user may ask "what is the toner level" and the system would reply, "There is sufficient toner for your job. By the way, there are seven print jobs ahead of yours. Anticipated wait time for your job is 12 minutes."

These main factors for ranking are weighted differently based on how the chatbot is engaged and personal preferences.

After the ranking process and any personalization is completed, the chatbot responds with what it thinks is the best option, a list of options, or lets you know if it doesn't understand your request. If there are several highly ranked responses, the chatbot may ask for more information to clarify the user's intent, give follow-up suggestions or offer related things that can be asked.

The MFP processes information about monitored device states. The device generates indicators to users about various issues, such as toner issues, drawer empty and various alerts. The subject chatbot adds a voice implementation for warnings and other information, and to receive instructions. Example embodiments employ a microphone and speaker with an MFP to provide verbal answers to a user's questions.

In further example embodiments herein, the natural language chatbot allows users to add a voice implementation for warnings and other information. The chatbot provides answer to a user's question. It also suitably communicates warnings over a time interval in one or multiple supported languages. Users can also personalize by adding their own account to the device itself. This enables the system to intelligently predict outcomes and other problems the user may face.

In addition, the user can also personalize by adding their own account to the device itself. Then the device can intelligently predict outcomes and other problems the user may face. Example embodiment include a screen display showing commands that a user has added to their personal account.

Example embodiments herein receive state information directly from an MFP hardware monitor and provide direct MFP control. State information can also be received from a monitoring function of an MFP management system, such as TopAccess from Toshiba TEC. TopAccess provides device management from an external device such as desktop or notebook computer. A status monitor allows one to view a display including device summary information and printer information, such as a state of paper cassettes and job counters. TopAccess also provides event notification or alerts when events occur, such as a paper out condition or print interruption TopAccess generates a corresponding alert icon and message.

TopAccess also performs job management, providing access to features such as a general print queue, private print queue, proof print queue, scheduled print queue, fax queue, e-filing queue, or invalid queue. The system also monitors progress of jobs until they are printed on a device. Deletion or job release can also be performed in queues.

State information can also be received by cloud based applications, such as e-BRIDGE Cloud Connect from Toshiba TEC, which provides real time device alerts, meter data, toner levels, and the like.

Example embodiments herein provide a system allowing users to communicate with MFPs using vocal or audible inquiries or commands. The MFP also communicates with users using vocal or audible output about alerts and other issues. The system is suitably integrated with a virtual assistant platform such as Amazon Alexa, Google Assistant or Apple Siri.

Example embodiments invoke question and answer dialog with the user to help complete copy tasks, troubleshoot errors or assist with self-service. The system remembers a user's previous tasks and builds a memory of their preferences, allowing suggestions to be tailored to the user's needs. The system suitably personalizes user accounts via voice commands. The system intelligently predicts when user a is at an impasse for device operation, such as being over a time threshold, and offers suggestions. The system collects data from networked devices to learn over time about common problems, suitably accomplished by artificial intelligence or machine learning. Machine learning or artificial intelligence applications can be implemented on any suitable platform such as Microsoft's AZURE. Alternatives, by way of example, include platforms INZATA, ANSWEROCKET, SEEBO, and others.

FIG. 1 illustrates an example embodiment of a multifunction peripheral natural language chatbot system 100. User 104 uses MFP 108 to process a document 112. Document 112 can be a tangible document for scanning into an electronic document or an electronic document for printing or rendering as a tangible document. MFP 108 has an associated microphone 116 to capture and digitized sound, as with speech from user 104. Captured speech is processed and converted to text. Speaker 120 is also associated with MFP 108 and functions to output speech from text. Captured speech is suitably digitally analyzed and processed within the MFP itself, or via an external language processing system. Included in FIG. 1 is network cloud 124, suitably comprised of a local area network (LAN), a wide area network (WAN), which may comprise the Internet, or any suitable combination thereof. Network cloud is comprised of any suitable wireless or wired data connection or combination thereof, such as with data communication via Wi-Fi access point. In the illustrated example, MFP 108 includes Wi-Fi connection 132 for network or Wi-Fi direct communication, and Bluetooth connection 134 for device-to-device data communication, such as with smartphone 136 associated with user 104. Smartphone 136 includes a microphone and speaker, and is suitably used as a voice interface for chatbot 144 via wireless data exchange.

Language processing is also suitably done via a server, such as language processing server 140 in data communication with MFP 108 via network cloud 124. Example language processing may be accomplished with suitable online or offline service such as Amazon Alexa, Apple Siri, Google Assistant, Samsung Bixby or Microsoft Cortana. Language processing capability provides for implementation of chatbot 144 associatively with MFP 108. Chatbot 144 allows for a natural dialog exchange with user 104. As used herein, chatbot is understood to include intelligent processing in addition to exchange of dialog.

In the illustrated example of FIG. 1, user 104 commences a dialog with chatbot 144 with a command 148 to check printer toner. Chatbot 144 identifies user 104 by voiceprint analysis, as well as a language used, and parses and analyzes digitized speech. MFP includes a hardware monitor which includes an ability to monitor toner levels. MFP 108 identifies document 112 as being associated with user 104, now identified as Halley. This combination of factors allows MFP to output a verbal response 154 in Halley's language which addresses Halley by name, supplies toner information relative to their associated job. Chatbot 144 goes further, knowing that users frequently query when a document will be printed or processed. Chatbot 144 therefore includes in the verbal response 154, though not asked in this situation, information as to when Halley's document will print, and gives her the option to be wait or notified when it is printed. Halley's response 158 is for print notification. Chatbot 144, having identified Halley, is aware of her contact information, including phone extension, e-mail address or smartphone number for a notification by phone call, text or e-mail and asks at 162 for a contact preference. Halley's response 166 selects the e-mail option, and chatbot 144 confirms with response 170.

In the example of FIG. 1, chatbot 144 is further enabled to generate reports or alarms relative to a status of or required actions for MFP 108. In the example, chatbot 144 is aware that MFP 108 requires servicing, and issues a warnings 174, suitably repeated at desired intervals until servicing is no longer needed. Warnings 174 are suitably issued in selected or multiple languages.

Figure 2:
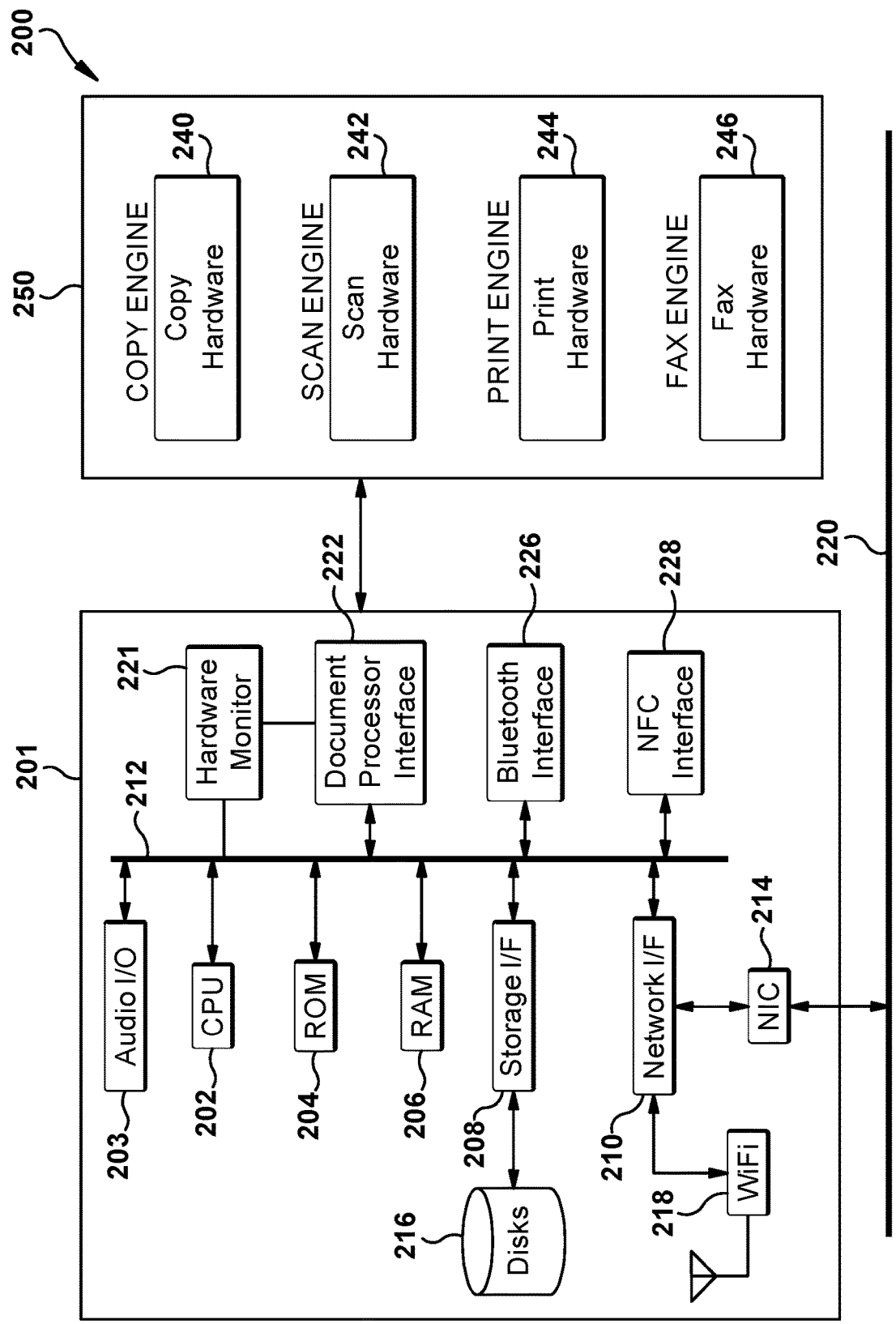
FIG. 2 is an example embodiment of a networked digital device, such as multifunction peripheral.

Turning now to FIG. 2, illustrated is an example embodiment of a networked digital device comprised of document rendering system 200 suitably comprised within an MFP, such as with MFP 108 of FIG. 1. It will be appreciated that an MFP includes an intelligent controller 201 which is itself a computer system. Thus, an MFP can itself function as a server with the capabilities described herein. Included in intelligent controller 201 are one or more processors, such as that illustrated by processor (CPU) 202. Each processor is suitably associated with non-volatile memory, such as read-only memory (ROM) 204, and random access memory (RAM) 206, via a data bus 212. Processor 202 is also in data communication with audio input/output module 203.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired interface or physical network connection 220, or to a wireless data connection via wireless network interface 218. Example wireless data connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like.

Processor 202 can also be in data communication with any suitable user input/output (I/O) interface 219 which provides data communication for interfacing with user peripherals, such as displays, keyboards, mice, track balls, touch screens, or the like. Processor 202 can also be in communication with hardware monitor 221, such as a page counter, temperature sensor, toner or ink level sensor, paper level sensor, or the like. Processor 202 can also be in data communication with the audio input/output module 203 for receiving and sending audio messages, for example, from and to a user 104.

Also in data communication with data bus 212 is a document processor interface 222 suitable for data communication with the document rendering system 200, including MFP functional units. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Figure 3:
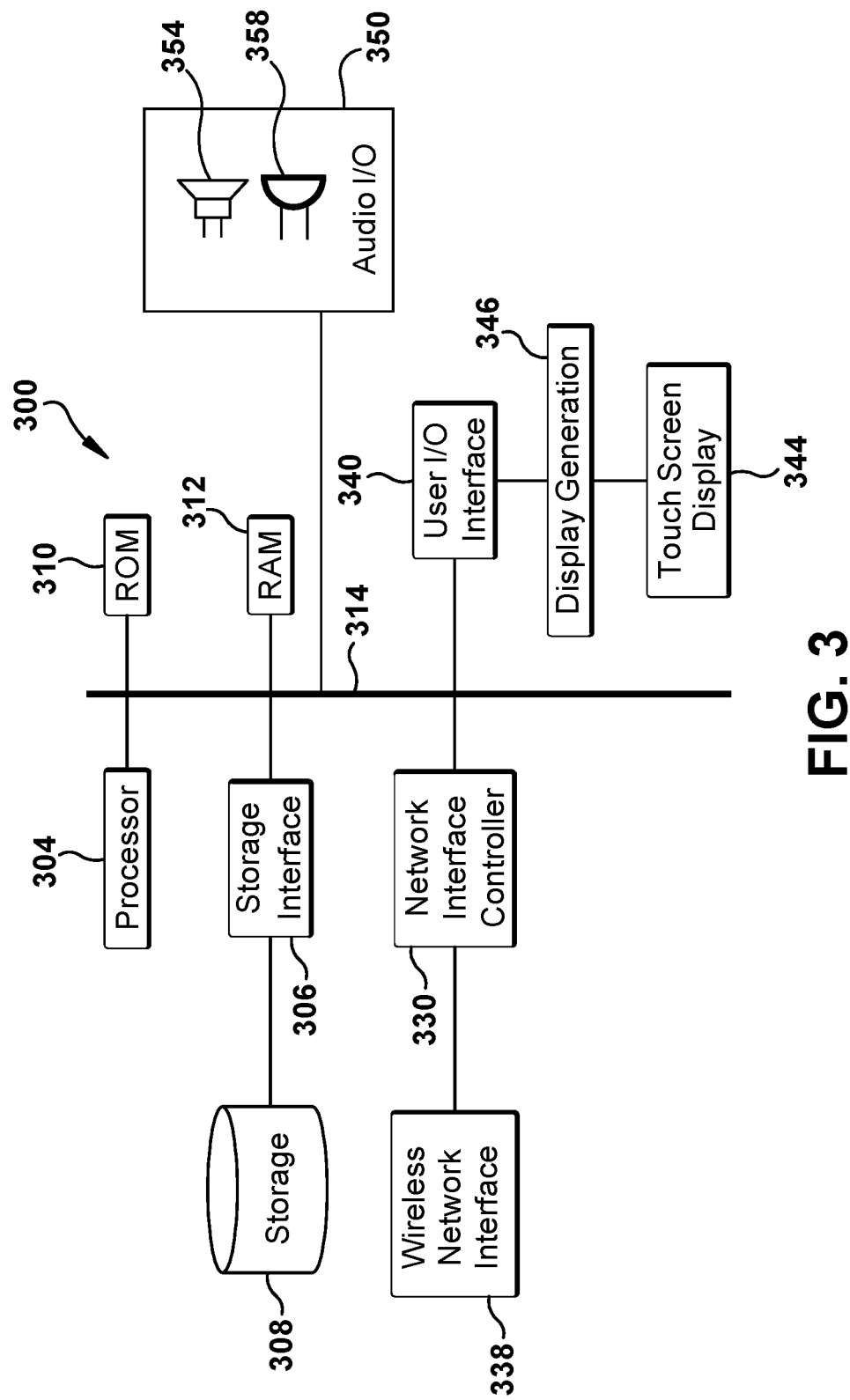
FIG. 3 is an example embodiment of a digital device system.

Turning now to FIG. 3, illustrated is an example embodiment of a digital data processing device 300 such as server 140 or smartphone 136 of FIG. 1. Components of the digital data processing device 300 suitably include one or more processors, illustrated by processor 304, memory, suitably comprised of read-only memory 310 and random access memory 312, and bulk or other non-volatile storage 308, suitably connected via a storage interface 306. A network interface controller 330 suitably provides a gateway for data communication with other devices, such as via wireless network interface 338. A user input/output interface 340 suitably provides display generation 346 providing a user interface via touchscreen display 344, suitably displaying images from display generator 346. It will be understood that the computational platform to realize the system as detailed further below is suitably implemented on any or all of devices as described above. Processor 304 is also in data communication with audio input/outputs system 350 which includes speaker 354 and digital microphone 358.

Figure 4:
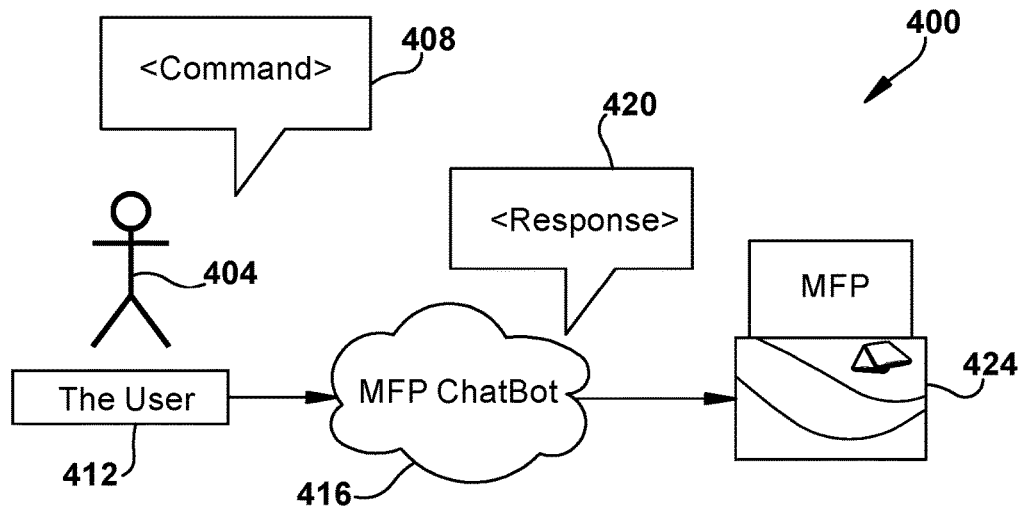
FIG. 4 is a system overview of an example embodiment of a multifunction peripheral natural language chatbot system.

FIG. 4 illustrates a system overview 400 of an example embodiment of a multifunction peripheral natural language chatbot system. User 404 issues verbal command 408, via block 412 to chatbot 416 which generates response 420. Natural language exchange between user 404 and chatbot 416 serves to report on or operate MFP 424.

Figure 5:
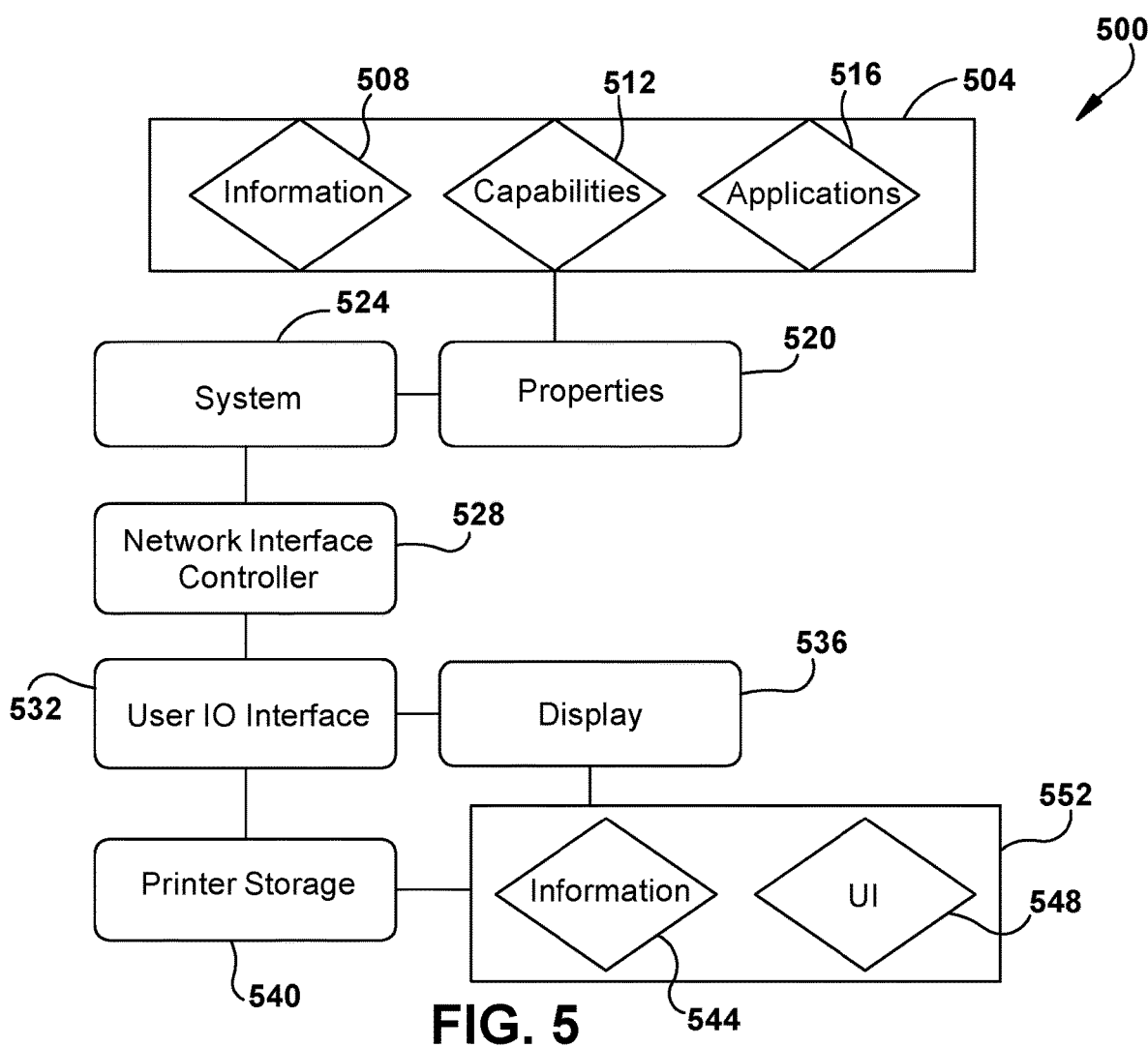
FIG. 5 is a hardware block diagram of an example embodiment of a multifunction peripheral natural language chatbot system.

FIG. 5 illustrates a software block diagram 500 of an example embodiment of a multifunction peripheral natural language chatbot system. Block 504 includes information 508, such as voiceprints, phrases, responses user information and hardware status. Block 504 includes capabilities 512, such as processing, data communication, printing, scanning, faxing, e-mailing or texting, as well as audio input and output. Block 504 operates in conjunction with applications 516 to accomplish functionality noted herein. Properties 520 of such information, capabilities and applications form system 524 which engages in data communication via network interface controller and user input/output interface 532. Display 536 and printer data storage 540 function with information 544 and user interface 548, collectively set as block 552.

Figure 6:
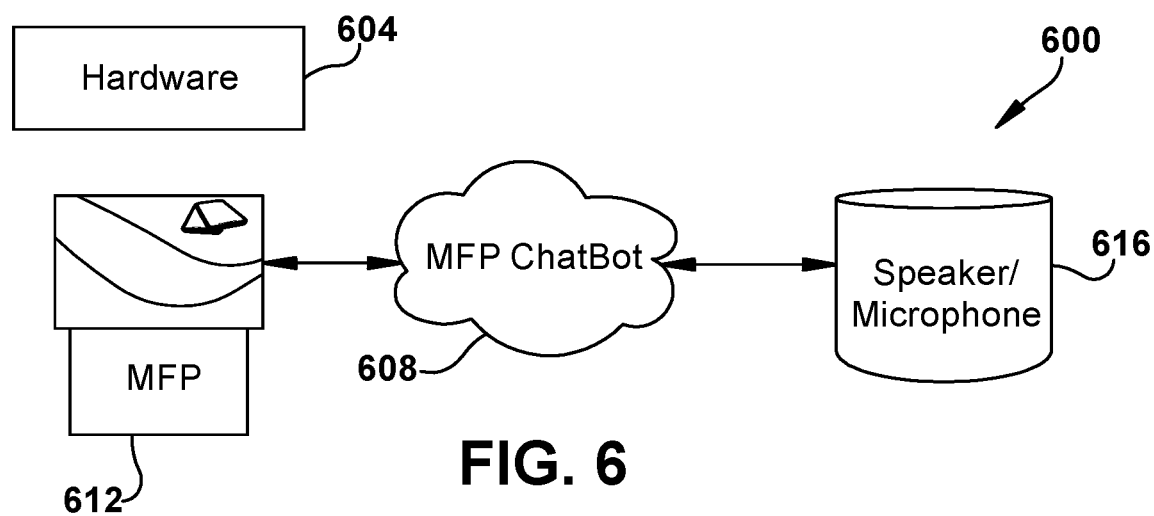
FIG. 6 is a software block diagram of an example embodiment of a multifunction peripheral natural language chatbot system.

FIG. 6 illustrates a software block diagram 600 of an example embodiment of a multifunction peripheral natural language chatbot system, illustrating a flow of communication between humans, applications and an MFP. Software running on hardware platform 604 facilitates communication via chatbot 608 between MFP 612 and speaker/microphone system 616.

Figure 7A:
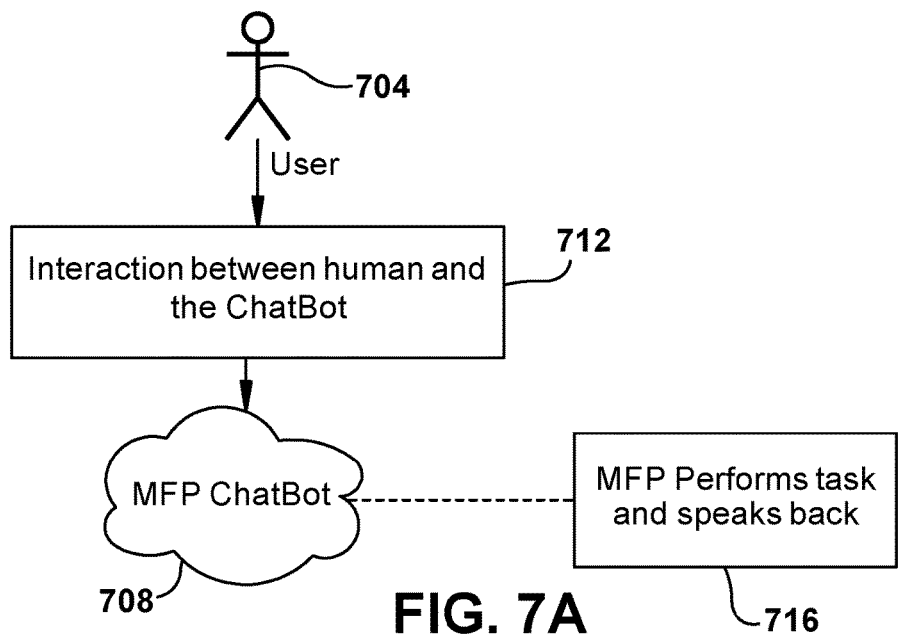
FIGS. 7A, 7B and 7C illustrate speaker/chatbot communication in an example embodiment of a multifunction peripheral natural language chatbot system.
Figure 7B:
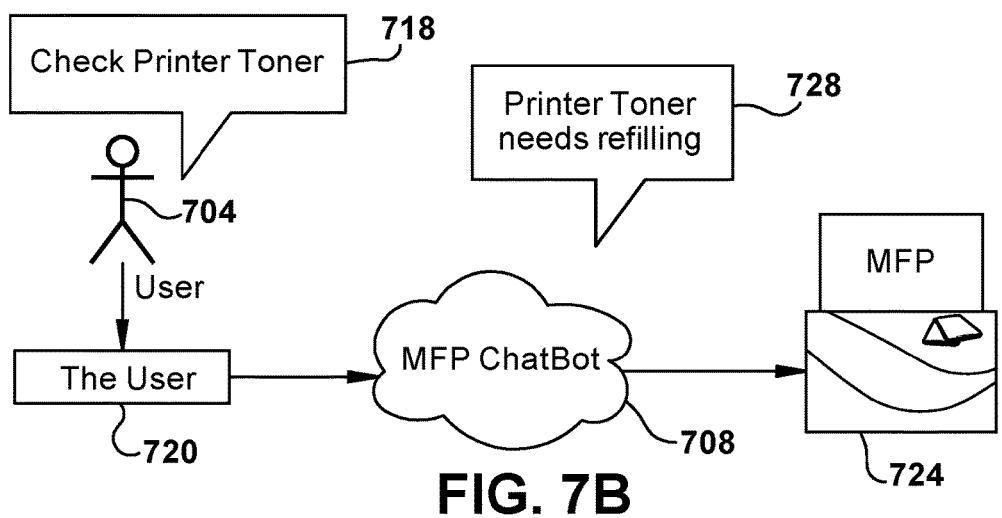
Figure 7C:
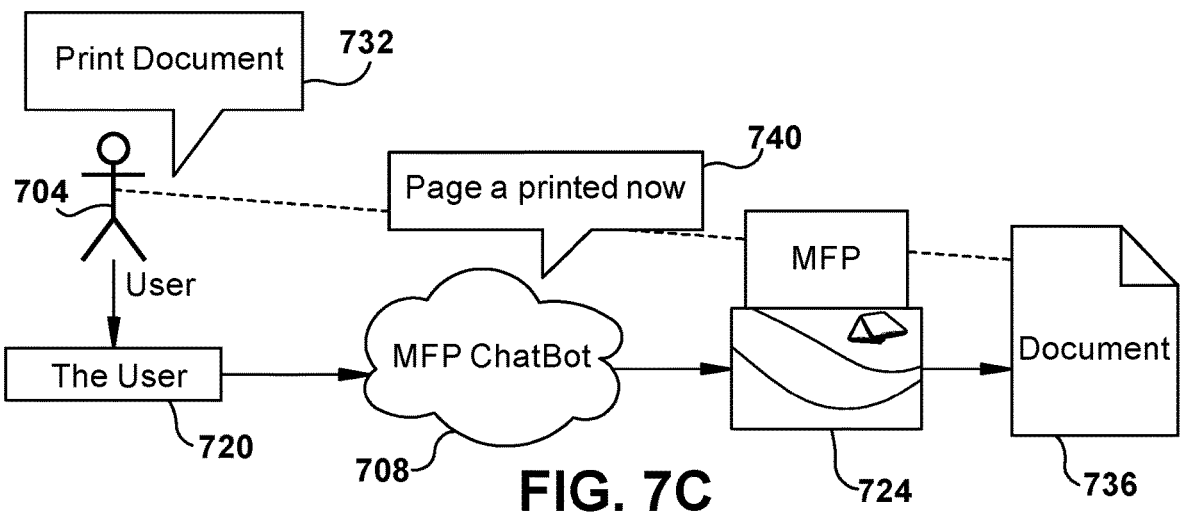

FIGS. 7A, 7B and 7C illustrate speaker/chatbot communication in an example embodiment of a multifunction peripheral natural language chatbot system. As summarized in FIG. 7A, user 704 and chatbot 708 interact as noted by block 712. Such interaction directs MFP task performance as illustrated at block 716. A specific example of such interaction is illustrated in FIGS. 7B and 7C.

In FIG. 7B, user 704 issues verbal command 718 to check printer toner via block 720 to chatbot 708 which results in a check of toner level in MFP 724. Chatbot 708 generates reply 728 informing the user 704 that toner needs refilling.

In FIG. 7C, user 704 issues instruction 732 to chatbot 708 to print document 736. Once the MFP 724 completes printing, chatbot 708 notifies the user 704 with reply 740.

Figure 8:
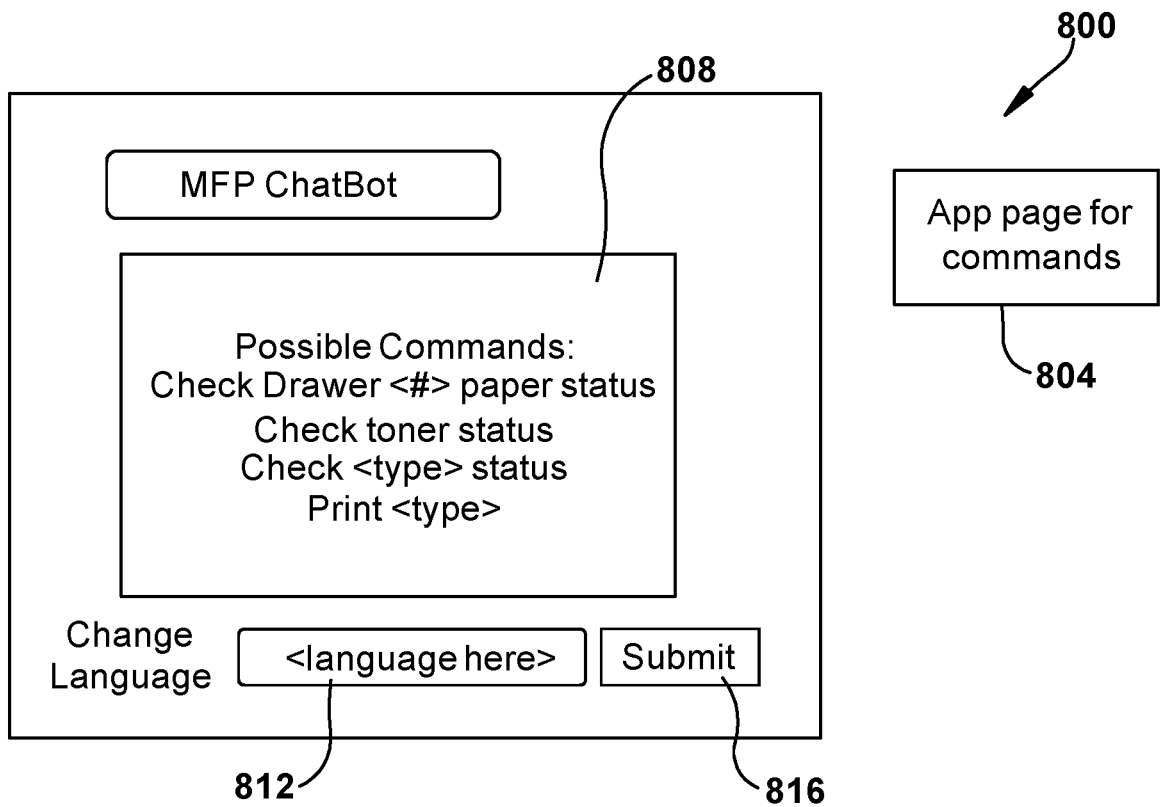
FIG. 8 is an interface of an example embodiment wherein a chatbot can be structured via generation of an page for application of commands.

FIG. 8 is an interface 800 illustrating an example embodiment wherein a chatbot can be structured via generation of a page for application of commands 804. The interface is suitably generated on any display, such as touchscreen display 344 of FIG. 3. Possible commands are entered or edited in box 808. Illustrated example commands include checks of drawer status, paper status, toner status or print type. A desired language may be set at block 812. Updated settings are sent to a chatbot by selecting submit button 816.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A document processing system comprising:
   a microphone configured to receive digitized human speech comprising an inquiry from a user related to a current state of the document processing system;
   a memory storing text responses associatively with one or more requests;
   the memory further storing a list of identified users, wherein each identified user in the list is associated with historical request information corresponding to prior requests;
   a hardware monitor configured to monitor device states of a multifunction peripheral; the memory further storing text strings corresponding to each of a plurality of multifunction peripheral device states;

a document processing engine including a scanner and a printer;
a processor and associated memory, the processor configured for speech-to-text conversion of the digitized human speech received via the microphone to form inquiry text;
the processor further configured to determine an identity of the user in accordance with the digitized human speech received from the user;
the processor further configured to determine two or more text responses corresponding the inquiry text and one or more text strings corresponding to device states monitored by the hardware monitor and historical request information associated with the identified user;
the processor further configured to generate a ranking of each determined text response, the ranking being determined by one or more of a confidence level relative to the received inquiry, availability of a response to a particular interpretation of the received query, a satisfaction level associated with previous responses to a similar inquiry, and a timing associated with previous responses; and
the processor further configured to output verbal responses from a speaker in accordance with the two or more determined text responses, their associated ranking and the one or more text strings.

2. The document processing system of claim 1 wherein the hardware monitor is configured to monitor one or more of toner level, ink level, paper level, loaded paper size, device errors, job queue and paper jams.

3. The document processing system of claim 2 wherein the processor is further configured to periodically generate a verbal warning via the speaker in accordance with one or more states of the document processing system monitored by the hardware monitor.

4. The document processing system of claim 3 wherein the verbal warning is generated in multiple languages.

5. The document processing system of claim 4 wherein the processor is further configured to associate one or more print jobs with an identified user.

6. The document processing system of claim 5 wherein the processor is further configured to output the verbal responses from the speaker in accordance with the one or more print jobs associated with the identified user.

7. The document processing system of claim 1 wherein the processor is further configured to determine a language associated with received inquiry and output the verbal responses in the determined language.

8. A method comprising:
generating, via a processor from voice input received from a user into a microphone, digitized human speech comprising an inquiry related to a current state of a document processing system;
storing, in a memory, text responses associatively with one or more requests;
storing, in the memory, a list of identified users wherein each identified user in the list is associated with historical request information corresponding to prior requests;
monitoring device states of a multifunction peripheral;
storing, in the memory, text strings corresponding to each of a plurality of multifunction peripheral device states;
a document processing engine including a scanner and a printer;
converting, via the processor, the digitized human speech received via the microphone to text to form inquiry text;
determining an identity of the user in accordance with the digitized human speech received from the user;
determining one two or more text responses corresponding to the inquiry text and one or more text strings corresponding to device states monitored by a hardware monitor and historical request information associated with the identified user;
the processor further configured to generate a ranking of each determined text response, the ranking being determined by one or more of a confidence level relative to the received inquiry, availability of a response to a particular interpretation of the received query, a satisfaction level associated with previous responses to a similar inquiry, and a timing associated with previous responses;
outputting, via a speaker, verbal responses from the speaker in accordance with the two or more determined text responses and the one or more text strings; and
scanning or printing a document associated with the voice input.

9. The method of claim 8 further wherein the device states comprise one or more of toner level, ink level, paper level, loaded paper size, device errors, job queue and paper jams.

10. The method of claim 9 further comprising periodically generating a verbal warning via the speaker in accordance with one or more monitored device states.

11. The method of claim 10 further comprising generating the verbal warning in multiple languages.

12. The method of claim 9 further comprising identify, via the processor, a user in accordance with received digitized human speech.

13. The method of claim 12 associating, via the processor, one or more print jobs with an identified user.

14. The method of claim 13 further comprising output the verbal responses from the speaker in accordance with the one or more print jobs associated with the identified user.

15. The method of claim 8 further comprising determining a language associated with received inquiry and outputting the verbal responses in the determined language.

16. A method comprising:
receiving a document processing job from an associated user;
generating inquiry text from digitized speech corresponding to an inquiry received into a microphone from the associated user;
analyzing, via a processor, generated inquiry text to identify one or more words or phrases;
analyzing, via the processor, generated inquiry text to identify the associated user;
receiving state data corresponding to a current state of a multifunction peripheral into memory;
receiving, from the memory, two or more text strings corresponding to the one or more identified words and phrases and the state data;
receiving, from the memory, historical request information associated with the identified user;
generating a ranking of each received text string, the ranking being determined by one or more of a confidence level relative to the received inquiry, availability of a response to a particular interpretation of the received query, a satisfaction level associated with previous responses to a similar inquiry, and a timing associated with previous responses;
generating speech output from a speaker corresponding the two or more text strings in accordance with its associated ranking;

generating instruction text from the digitized speech received in the microphone from the associated user responsive to generated speech output;

analyzing generated instruction text; and performing a document processing operation on the document processing job in accordance with analyzed instruction text.

17. The method of claim 16 further comprising receiving, from the memory, the one or more text strings in accordance with an identity of the user.

18. The method of claim 16 further comprising identifying a language associated with the digitized speech corresponding to the inquiry and generating the speech output in the identified language.

* * * * *